US008725751B1

(12) United States Patent
Lai et al.

(10) Patent No.: US 8,725,751 B1
(45) Date of Patent: May 13, 2014

(54) METHOD AND APPARATUS FOR BLOCKING OR BLURRING UNWANTED IMAGES

(75) Inventors: Cheng-Jyun Lai, Taipei (TW); Wei-Chin Chen, Taipei (TW); Shih-Yun Chen, Pingtung (TW)

(73) Assignee: Trend Micro Incorporated, Tokyo (JP)

( * ) Notice: Subject to any disclaimer, the term of this patent is extended or adjusted under 35 U.S.C. 154(b) by 1077 days.

(21) Appl. No.: 12/200,811

(22) Filed: Aug. 28, 2008

(51) Int. Cl.
*G06F 17/30* (2006.01)
*G06F 7/00* (2006.01)

(52) U.S. Cl.
USPC ............ 707/757; 707/804; 715/273; 382/190

(58) Field of Classification Search
USPC ................... 707/757, 804; 715/273; 382/190
See application file for complete search history.

(56) References Cited

U.S. PATENT DOCUMENTS

| | | | |
|---|---|---|---|
| 6,615,266 B1 * | 9/2003 | Hoffman et al. | 709/227 |
| 6,701,350 B1 * | 3/2004 | Mitchell | 709/217 |
| 6,742,047 B1 * | 5/2004 | Tso | 709/246 |
| 7,027,645 B2 * | 4/2006 | Swift | 382/165 |
| 7,231,392 B2 * | 6/2007 | Ro | 1/1 |
| 7,308,648 B1 * | 12/2007 | Buchthal et al. | 715/234 |
| 2003/0009495 A1 * | 1/2003 | Adjaoute | 707/501.1 |
| 2003/0108240 A1 * | 6/2003 | Gutta et al. | 382/181 |
| 2005/0063615 A1 * | 3/2005 | Siegel et al. | 382/309 |
| 2006/0147094 A1 * | 7/2006 | Yoo | 382/117 |
| 2007/0130525 A1 | 6/2007 | Murphy et al. | |
| 2007/0133947 A1 * | 6/2007 | Armitage et al. | 386/95 |
| 2008/0106615 A1 * | 5/2008 | Ahonen et al. | 348/231.99 |
| 2008/0181533 A1 * | 7/2008 | Jung et al. | 382/283 |

OTHER PUBLICATIONS

Sonya A. Coleman, et al., "Content-adaptive feature extraction using image variance", May 2005, pp. 2426-2436, Pattern Recognition Society, published by Elsevier Ltd., NothernIreland.
A W Gruen, "Adaptive Least Squares Correlation: A Powerful Image Matching Technique", 1985, pp. 175-187, Institute of Geodesy and Photogrammetry Swiss Federal Institute of Technology, Zurich.

* cited by examiner

*Primary Examiner* — Shew-Fen Lin
(74) *Attorney, Agent, or Firm* — Okamoto & Benedicto LLP

(57) ABSTRACT

One embodiment relates to an apparatus for blocking or blurring unwanted image features. The apparatus includes at least a memory, a processor, a browsing application, and an image blocking component. The image blocking component is configured to block or blur images with unwanted image features before the images are displayed by the browsing application. Another embodiment relates to a process for blocking or blurring unwanted image features prior to displaying web pages. A web page including an image is received, but it is not displayed the image until after checking the image for unwanted image features. Image features are extracted from the image, and the extracted image features are compared against features in a customized image feature database. The image is displayed if no match is found during said comparison. The image is blocked or blurred if a match is found during said comparison. Other embodiments are also disclosed.

4 Claims, 7 Drawing Sheets

METHOD AND APPARATUS FOR BLOCKING OR BLURRING UNWANTED IMAGES

BACKGROUND

1. Field of the Invention

The present invention relates generally to computer and communications systems.

2. Description of the Background Art

Web threats encompass a broad array of threats that originate from web sites on the Internet. For example, a web site may a "phish" site. A "phish" site is a fraudulent site that attempts to trick a user into providing sensitive information, such as credit card information, or user names and passwords. As another example, a web site may be a source of malicious code. Computer viruses, worms, Trojans, and spyware are examples of malicious code. Malicious code may, for example, corrupt or delete important files, send e-mails without user authorization, render a computer inoperable, or cause other types of damage to a computer. Malicious code may be communicated between computers, for example, by transferring files that include the code.

While technology has been developed to help protect users from the above web threats, there appears to be ineffective or very limited technology to protect users from viewing unwanted images over the web. For example, some people are afraid of spiders and seeing images that contain spiders may make them very uncomfortable. As another example, most parents want to protect their children from seeing pornographic or excessively gruesome images on the web. Hence, there is a strong need to protect users from accidentally seeing unwanted images over the web. Since web sites with unwanted or offensive images may be normal and virus-free, current technologies such as web reputation, do not serve to adequately protect users from accidentally viewing such images.

SUMMARY

One embodiment relates to an apparatus for blocking or blurring unwanted image features. The apparatus includes at least a memory, a processor, a browsing application, and an image blocking component. The memory is configured to store and provide access to instructions and data, the processor is configured to execute said instructions, and the browsing application comprises instructions configured to access and display web pages including images. The image blocking component is configured to block or blur images with unwanted image features before the images are displayed by the browsing application. Other embodiments, aspects and features are also disclosed.

Another embodiment relates to a process for blocking or blurring unwanted image features prior to displaying web pages. A web page including an image is received, but it is not displayed the image until after checking the image for unwanted image features. Image features are extracted from the image, and the extracted image features are compared against features in a customized image feature database. The image is displayed if no match is found during said comparison. The image is blocked or blurred if a match is found during said comparison.

Other embodiments, aspects and features are also disclosed.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
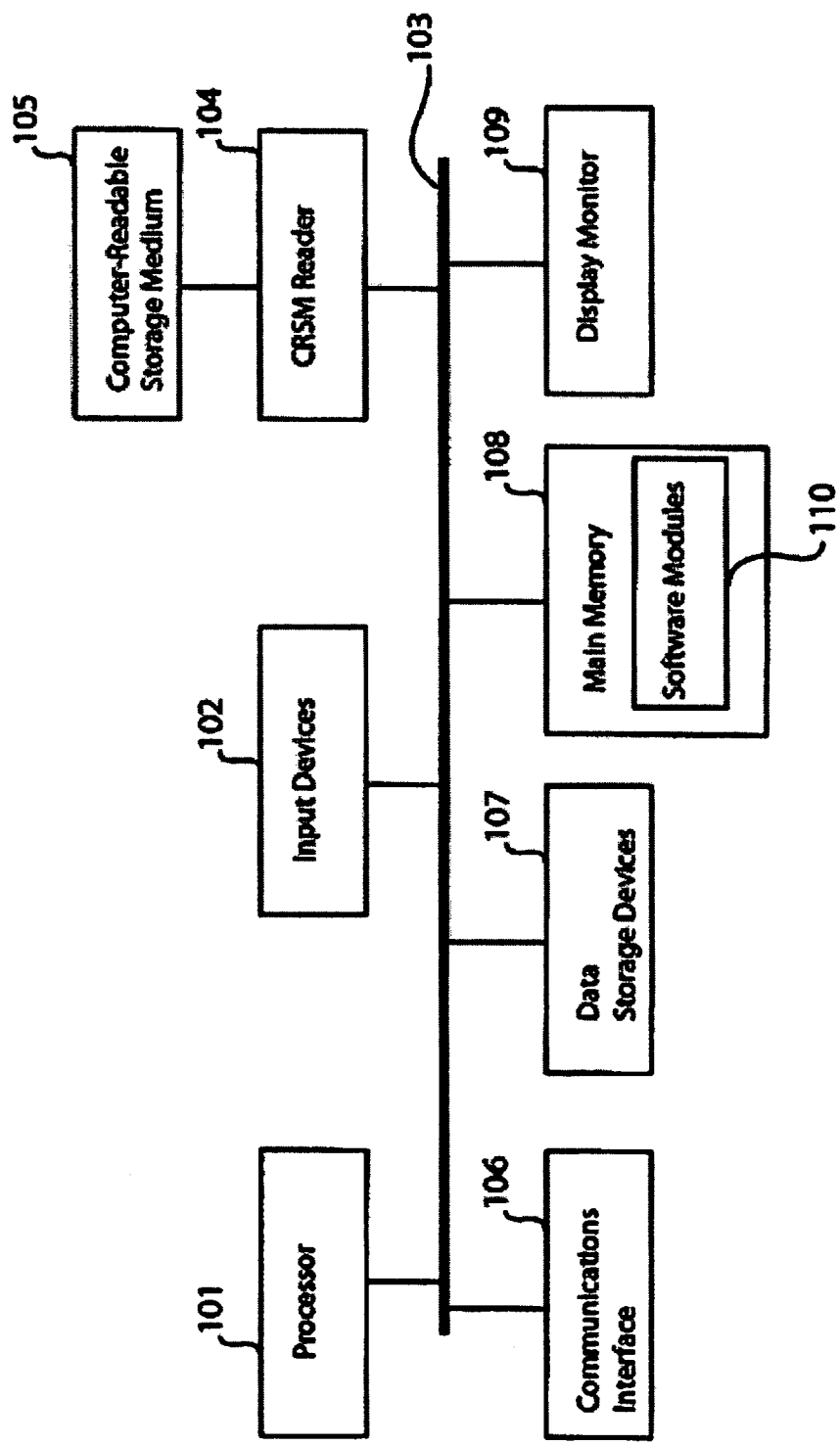
FIG. 1 is a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes software modules 110, which may comprise software components of later described support server computers and customer client computers. The software modules 110 may be executed by processor 101.

Figure 2:
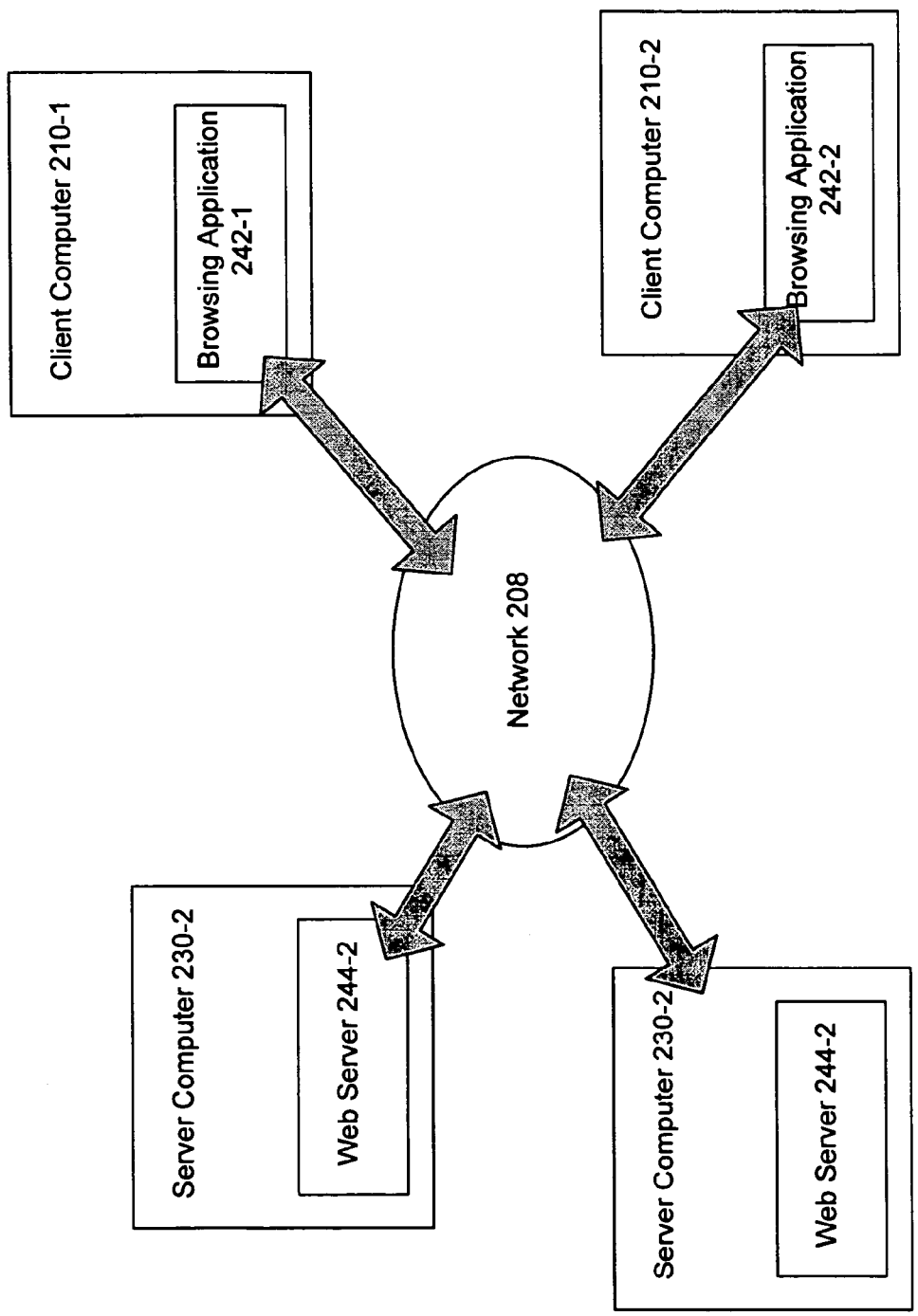
FIG. 2 is a schematic diagram of a conventional web browsing system.

FIG. 2 schematically shows a conventional web browsing system. The conventional web browsing system includes a plurality of client computers 210 (for example, 210-1 and 210-2 are depicted). The client computers 210 may comprise, for example, desktop or laptop personal computers. In addition, the system includes numerous server computers 230 (for example, 230-1 and 230-2 are depicted) and a network 208 which is configured to allow the various computers to communicate with each other. The network 208 may comprise, for example, a public computer network, such as the Internet.

Each client computer 210 may include a web browsing application 242 (for example, 242-1 and 242-2 are depicted in client computers 210-1 and 210-2, respectively). The server computer 230 may include a web server 244 (for example, 244-1 and 244-2 are depicted in client computers 230-1 and 230-2, respectively). Conventional web browsing applications include, for example, the Mozilla Firefox browser from the Mozilla Corporation, a subsidiary of the Mozilla Foundation. Conventional web servers include, for example, the Apache HTTP Server from the Apache Software Foundation. The browsing application 242 and the web server 244 may comprise computer-readable program code which work cooperatively with each other for sending and receiving web pages over the computer network 208.

Figure 3:
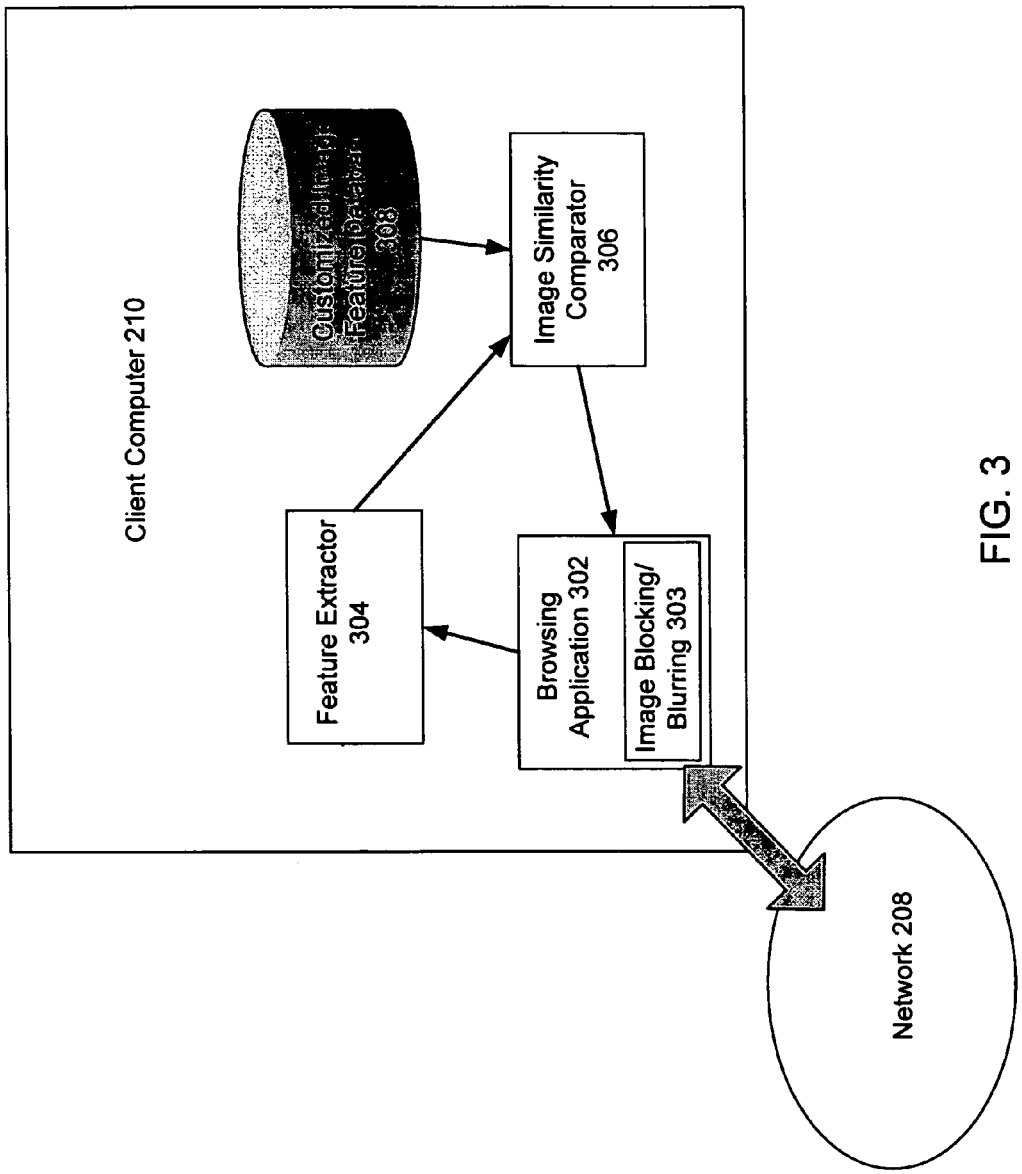
FIG. 3 is a schematic diagram of a web browsing system with customized image blocking in accordance with an embodiment of the invention.

FIG. 3 is a schematic diagram of a web browsing system with customized image blocking in accordance with an embodiment of the invention. A client computer 210 is shown communicatively connected to a network 208. In accordance with an embodiment of the invention, the client computer 210 includes browsing application 302 with a customized image blocking or blurring module or component 303, a feature extractor 304, an image similarity comparator 306, and a customized image feature database 308.

The browsing application 302 with a customized image blocking or blurring module or component 303 may be a modified version of a conventional web browser 242 where a software component or module has been added to provide the customized image blocking and/or blurring functionalities disclosed herein. Prior to the display of an image by the browsing application 302, the customized image blocking or blurring module or component 303 may be configured to provide the image data to the feature extractor 304. The image may be blocked or blurred if the customized image blocking or blurring module or component 303 receives an indication from the image similarity comparator 306 that one or more features in the image matches an unwanted image feature in the customized image feature database 308.

The feature extractor 304 is configured to process images and extract image features from the images. Image feature extraction generally involves simplifying image data to come up with image features that serve to describe the image data with a lesser amount of data. For example, the feature extractor 304 may be configured to implement a content-adaptive technique, such as the one described by S. A. Coleman, et al. in "Content-Adaptive Feature Extraction Using Image Variance," *Pattern Recognition*, vol. 38, 2005, pp. 2426-2436, the disclosure of which is hereby incorporated by reference. Other feature extraction techniques may also be used. The feature extractor 304 may be configured to provide the image features which it extracts to the image similarity comparator 306.

The image similarity comparator 306 is configured to provide image matching and comparison functionality. For example, the image similarity comparator 306 may be configured to implement a least squares correlation technique, such as the one described by A. W. Gruen in "Adaptive Least Squares Correlation: A Powerful Image Matching Technique," *S Afr J of Photogrammetry*, Remote Sensing and Cartography, 14 (3), 1985, pp. 175-187, the disclosure of which is hereby incorporated by reference. Other correlation techniques may also be used. The image similarity comparator 306 may be configured to receive image features for comparison from the feature extractor 304 and from the customized image feature database 308. The image similarity comparator 306 may be configured to provide results of its comparisons to the customized image blocking or blurring module or component 303 of the browsing application 302.

Figure 4:
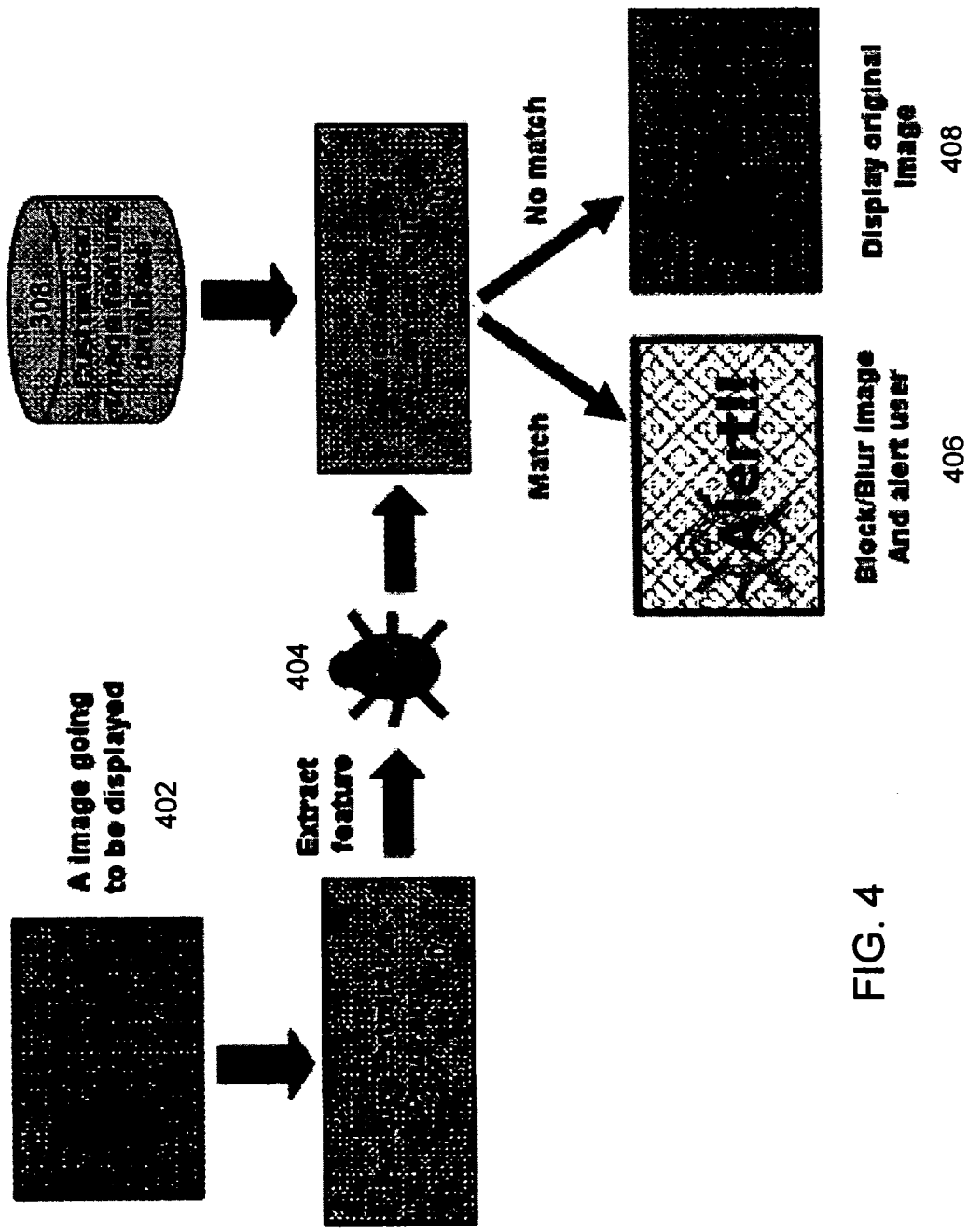
FIG. 4 schematically shows a process for customized image blocking in accordance with an embodiment of the invention.

FIG. 4 schematically shows a process for customized image blocking in accordance with an embodiment of the invention. As shown, an image 402 that is going to be displayed (if it is not blocked) is received by the client computer 210. For example, the image 402 may be received in digital format (such as in the form of a jpeg file, for example) from a web site via the network 208. In a specific example, the image may be of a spider.

However, instead of simply displaying the image 402 on the monitor of the client computer 210, the process determines whether or not the image 402 is to be blocked. In accordance with the process shown in FIG. 4, the image 402 may be first processed by the feature extractor (feature extraction program) 304. The feature extractor 304 processes the image to extract one or more image features 404. For example, an extracted image feature 404 may correspond to an object in the image, such as a spider, for instance.

The process may then forward the extracted feature(s) 404 from the feature extractor 304 to the image similarity comparator (image similarity comparison component) 306. The image similarity comparator 306 compares the extracted feature(s) 404 to image features from the customized image feature database 308. In other words, the customized image feature database 308 is searched to see if there is a match with the extracted feature(s) 404.

If there is a match, then the original image 402 is not displayed on the monitor of the client computer 210. Instead, the image may be blocked or blurred 406 prior to displaying on the monitor. In addition, the user may be alerted as to the blocking or blurring of the image 402. The alert may be inserted in place of the unwanted image 402 in a web page that is displayed. If blurring is applied, then either the entire image 402 or a portion including the offensive feature may be blurred. If there is no match, then the original image 402 is displayed 408 on the monitor of the client computer 210.

Figure 5:
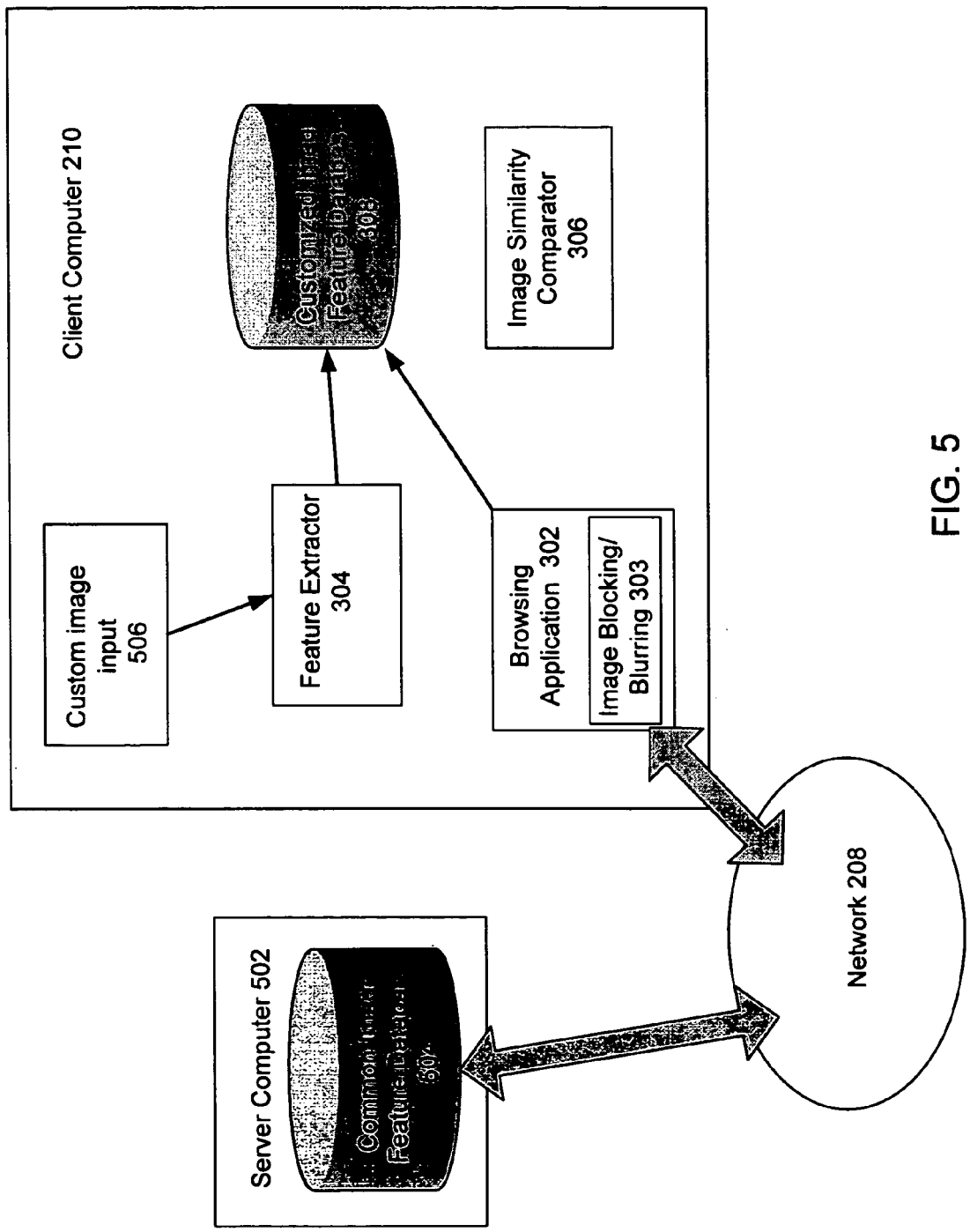
FIG. 5 is a schematic diagram of a web browsing system with customized image blocking showing a common image feature database and a custom image input component or module in accordance with an embodiment of the invention.

FIG. 5 is a schematic diagram of a web browsing system with customized image blocking showing a common image feature database 504 and a custom image input component 506 in accordance with embodiments of the invention.

One or more server computers 502 may be configured to store common image feature database 504. The common image feature database 504 is configured to store common image features that users may want to block or blur. The common image feature database 504 may be accessed by a client computer 210 by way of a network 208, such as the Internet, for example.

In addition, or alternatively, a client computer 210 may be configured with a custom image input component 506. The custom image input component 506 is configured to receive one or more images that include image objects or features that a user would like to block or blur. The custom image input component 506 may be configured to provide the user images to the feature extractor 304.

Figure 6:
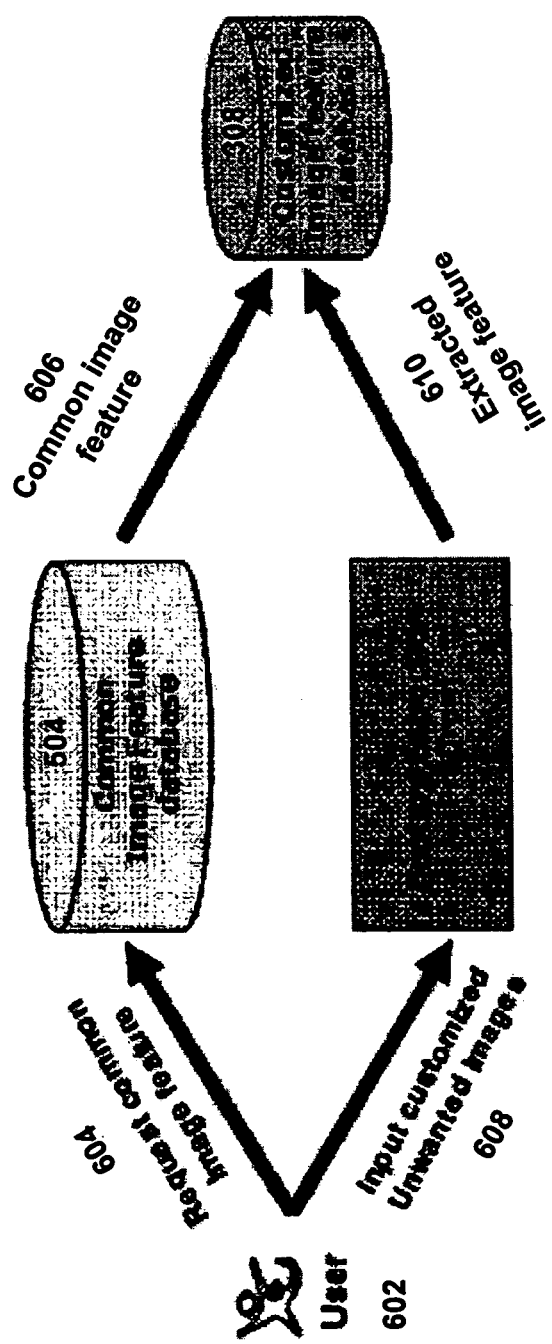
FIG. 6 schematically shows processes for providing image features for the customized image feature database in accordance with an embodiment of the invention.

FIG. 6 schematically shows processes for providing image features for the customized image feature database in accordance with an embodiment of the invention. Two processes for providing image features for the customized image feature database are illustrated.

In a first process, depicted by the upper path in FIG. 6, a user 602 makes a request 604 for a common image feature to be blocked or blurred. The common image feature in the request 604 may be selected from a list of commonly unwanted image features, such as spiders, cockroaches, rats, worms, and so forth. The commonly unwanted image features may also include pornographic images, violent images, illegal drug related images, crime images, and the like. The list of commonly unwanted image features may be provided by the image blocking or blurring module or component 303. The list may correspond to image features stored and maintained in the common image feature database 504. Alternatively to selecting an unwanted image feature from a list, a user 602 may input a keyword or keywords for the unwanted image feature. The image blocking or blurring module or component 303 may then include the keyword(s) in the request 604 so that the keyword(s) may be used to search the common image feature database 504 for corresponding image features to be blocked or blurred. The selected common image feature(s) may then be supplied 606 to the customized image feature database 308.

In a second process, depicted by the lower path in FIG. 6, a user 602 may input 608 an image or a collection of images that contain unwanted content. The image(s) may be in various formats, including jpeg, tiff, or others. The custom image input component or module 506 may receive the input image(s) and provide them to the feature extraction program 304. The feature extractor 304 may then extract image feature(s) from the input image(s). The extracted image feature(s) may then be supplied 610 to the customized image feature database 308.

Figure 7:
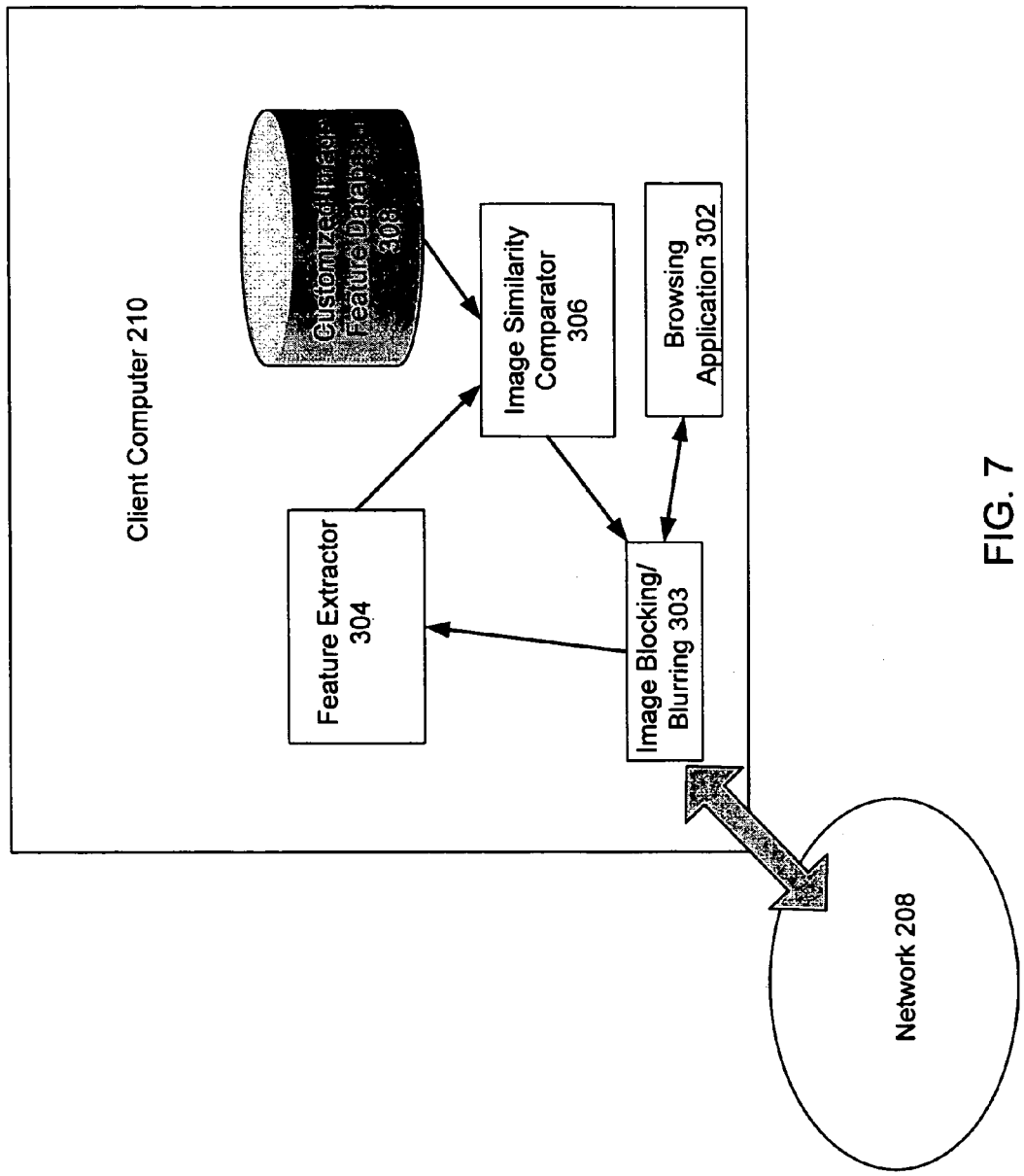
FIG. 7 is a schematic diagram of a web browsing system with customized image blocking in accordance with another embodiment of the invention.

FIG. 7 is a schematic diagram of a web browsing system with customized image blocking in accordance with another embodiment of the invention. In this system, the customized image blocking or blurring module or component 303 is not part of the browsing application 302. In this embodiment, the customized image blocking or blurring module or component 303 is configured to intercept or filter images prior to receipt of the images by the browsing application 302. Otherwise, this embodiment operates as described above. For example, the processes described above in relation to FIGS. 2 and 4 also apply in this embodiment.

While specific embodiments of the present invention have been provided, it is to be understood that these embodiments are for illustration purposes and not limiting. Many additional embodiments will be apparent to persons of ordinary skill in the art reading this disclosure.

Advantageously, in accordance with the above disclosure, users may specify his or her unwanted image content and be protected against viewing images with the unwanted content. While conventional web filtering services base their filtering on URLs (universal resource locators) via a black list and/or a white list, the present application discloses an apparatus and method for blocking or blurring image content based on image feature extraction and comparison.

What is claimed is:

1. An apparatus for blurring unwanted image features, the apparatus comprising:
   a memory for storing and providing access to instructions and data;
   a processor for executing said instructions;
   a browsing application comprising instructions for accessing and displaying web pages including images;
   a customized image feature database for storing a set of unwanted image features which is customized for a user;
   a common image feature database for storing commonly unwanted image features and a list of the commonly unwanted image features, receiving a request for commonly unwanted image features from the user, and providing the requested commonly unwanted image features to the customized image feature database for storage therein;
   a feature extractor for receiving and processing input images from the user and the images of the web pages, extracting image features from the input images from the user and from the images of the web pages, wherein the extracting is performed using a content-adaptive technique, providing the image features extracted from the input images to the customized image feature database for storage therein, and providing the image features extracted from the images of the web pages to an image similarity comparator;
   the image similarity comparator which compares, using least squares correlation, the image features extracted from the images of the web pages against the set of unwanted image features in the customized image feature database and which provides results of said comparison to an image blurring component; and
   the image blurring component which, upon receiving an indication from the image similarity comparator that a feature in an image of a web page matches an unwanted image feature in the customized image database, blurs the unwanted image feature in the image before the image is displayed by the browsing application.

2. The apparatus of claim 1, wherein the image blurring component is a module of the browsing application.

3. The apparatus of claim 1, wherein the image blurring component is separate from the browsing application.

4. A computer-implemented process for blurring unwanted image features prior to displaying web pages, the process comprising:
   storing unwanted image features in a customized image feature database which is customized for a user;
   receiving requests for commonly unwanted image features from the user;
   providing the requested commonly unwanted image features from a common image feature database to the customized image feature database for storage therein;
   receiving input images that contain unwanted content from the user;
   extracting, using a content-adaptive technique, image features from the input images by a feature extraction program;
   providing the image features extracted from the input images from the feature extraction program to the customized image feature database for storage therein;
   receiving a web page including an image by a computer apparatus, but not displaying the image until after checking the image for unwanted image features;
   extracting, using the content-adaptive technique, image features from within the image by the computer apparatus;
   comparing, using least squares correlation, the image features extracted from the image included in the web page against unwanted image features in the customized image feature database;
   displaying the image on a display of the computer apparatus if no match is found during said comparison; and blurring the unwanted image features in the image on the display of the computer apparatus if a match is found during said comparison.

\* \* \* \* \*